United States Patent [19]
Schubert

[11] 3,904,903
[45] Sept. 9, 1975

[54] LUMINESCENT SCREEN
[75] Inventor: Wolfgang Schubert, Frauenaurach, Germany
[73] Assignee: Siemens Aktiengesellschaft, Munich, Germany
[22] Filed: Feb. 7, 1973
[21] Appl. No.: 330,402

[30] Foreign Application Priority Data
Feb. 7, 1972   Germany............................ 2205681

[52] U.S. Cl............... 313/99; 117/33.5 E; 117/210; 117/211; 252/301.4 H
[51] Int. Cl....... H01j 39/18; B44d 1/02; B44d 1/40
[58] Field of Search............... 117/210, 211, 33.5 E; 252/301.4 H; 313/99

[56] References Cited
UNITED STATES PATENTS

| | | | |
|---|---|---|---|
| 2,817,785 | 12/1957 | Bell | 313/99 |
| 2,955,218 | 10/1960 | Schmidt | 313/89 |
| 3,011,919 | 12/1961 | Niklas | 117/211 |
| 3,048,732 | 8/1962 | Lehmann | 117/33.5 E |
| 3,446,745 | 5/1969 | Brickmann | 252/301.4 H |

Primary Examiner—William R. Trenor
Attorney, Agent, or Firm—V. Alexander Scher

[57] ABSTRACT

A luminescent screen consists of a carrier and a luminescent layer carried by the carrier. The carrier consists of a substance which is the basic substance of the luminescence.

3 Claims, 5 Drawing Figures

LUMINESCENT SCREEN

This invention relates to a luminescent screen consisting of a carrier and a luminescent screen placed thereon. Such luminescent screens are particularly required in vacuum image transformers wherein images of rays with very short waves, such as X-rays or gamma rays, are transformed into a visible image which then releases electrons in a photo cathode. The electrons are represented upon a luminescent screen by an electronic optical device and are made visible.

When inlet screens of transformer are constructed which are used for making visible the distribution of isotopes in bodies, it is necessary to mount upon a carrier luminescent layers of substantial thickness, such as 5 to 10 mm. Experiments have shown, however, that, for example, when using carriers of aluminum with layers applied thereon wherein the luminous substance consists of cesium-iodide activated with sodium, there can be either a change in the shape of the carrier or tears in the luminous layer, depending upon the thickness and strength of the aluminum cap. Both these changes have a negative influence upon the image making, since they produce distortions or spots.

An object of the present invention is to eliminate these drawbacks of existing constructions.

Other objects will become apparent in the course of the following specification.

In the accomplishment of the objectives of the present invention it was found desirable to make the carrier of a substance which is the basic substance of the luminous layer. In prior art screens aluminum is used having an expansion coefficient different from cesium iodide by the factor 2. In accordance with the present invention a carrier of cesium iodide is used so that there is no difference in expansion coefficient with a steamed on luminous layer of cesium iodide activated with sodium. The above described drawbacks are completely eliminated.

In case of larger carriers, particularly substantially hyperbolically bent calottes of vacuum image transformers, it is very advantageous to make the carrier out of smaller separate pieces. This can be carried out, for example, when using cesium iodide by making the carrier of pressed six-edged pieces having a suitable outer surface structure and being about 1 mm thick with sides of 20 to 30 mm. These pressed pieces are so placed together that the required curved shape is approximately produced. To produce the desired shape precisely and to hold the pieces together, a new pressing is carried out so that the contacting surfaces run into each other. For cesium iodide this requires a pressure of at least a few $10^3$ kp/cm$^2$. An outer surface can have the task of eliminating a plurality of reflections. For that purpose outer surfaces are preferred having the structure of rough, for example, causticized or rayed aluminum.

The invention will appear more clearly from the following detailed description when taken in connection with the accompanying drawing showing by way of example only, preferred embodiments of the inventive idea.

Figure 1:
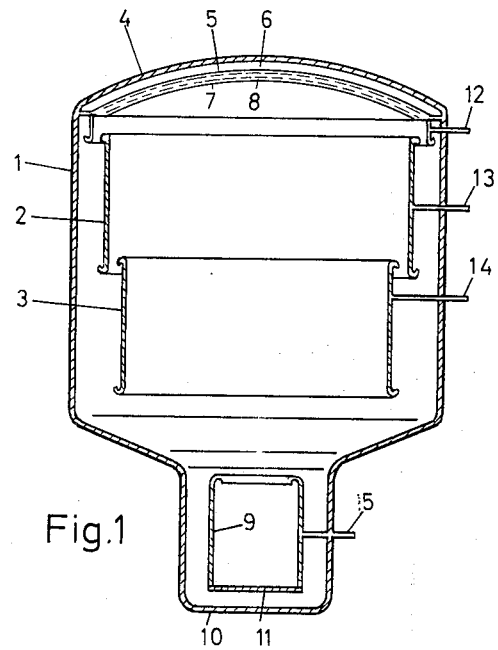
FIG. 1 is a section through an image transformer.

FIG. 1 shows a vacuum case 1 of glass in the middle part of which the electrodes 2 and 3 are located. The electrodes consist of refined steel sheets and have a cylindrical shape. They extend in the longitudinal axis of the image transformer behind the ray inlet window 4. A cathode device 5 is located between the electrodes 2, 3 and the window 4; it consists of a carrier 6 of cesium iodide, a luminous layer 7 of cesium iodide activated by sodium and the actual photo cathode layer 8 of antimony-cesium (SbCs$_3$). The anode 9 is also located along the longitudinal axis opposite the end opening of the electrode 3. The anode 9 is also a cylindrical sheet part, as are the electrodes 2 and 3. The anode 9 carries upon its end directed to the end window 10 of the case 1 the luminescent screen 11.

The image amplifier is actuated in known manner by applying corresponding voltages to connections 12, 13, 14 and 15, so that electrons released at the photo cathode layer 8 which consists of antimony-cesium (SbCs$_3$) are represented upon the luminescent screen 11. Observation takes place through the end window 10. There can be also provided a remote view reproducing device, a photographing device, etc.

Figure 2:
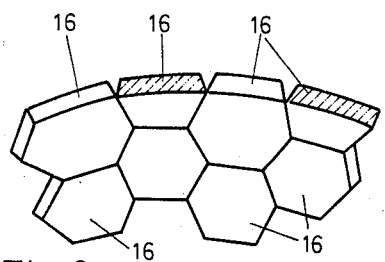
FIG. 2 is a partial view of a carrier which must carry the luminous layer and the photo cathode and which is composed of six-edged pressed pieces.
Figure 4:
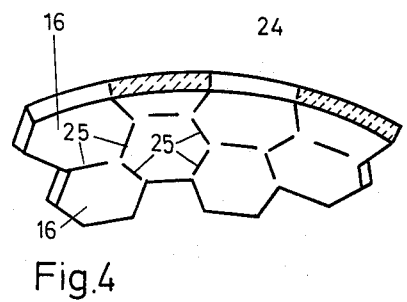
FIG. 4 shows the six-edged pressed pieces of FIG. 2 after they have been subjected to a pressing operation.
Figure 5:
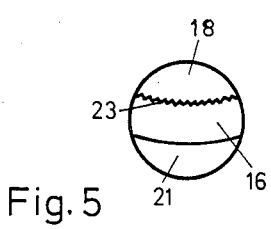
FIG. 5 shows a pair of a luminous layer located in the press for making a structured outer surface.
Figure 3:
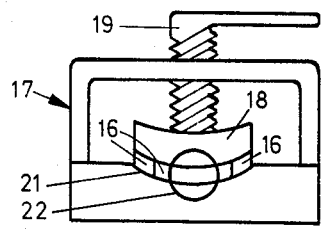
FIG. 3 is a diagrammatic side view showing the pressing operation.

FIG. 2 shows a cut out piece from the carrier 6 which is composed of pressed pieces 16. They consist of cesium-iodide, have an edge to edge length of 25 mm and a thickness of about 1 mm. The desired calotte shape is produced by placing them upon a correspondingly shaped support. After the pieces have filled the entire form of the calotte 6, they are brought in this arrangement into a press and are pressed at 2 to 5 × $10^3$ kp/cm$^3$. In the construction of FIG. 3 a stamp 18 of the press 17 is pressed against the pieces 16 by rotating the spindle 19, the pieces 16 being located upon a support 21. Thus a homogenized shaped shape of the calotte is produced, shown in FIG. 4 and indicated by the numeral 24. The end surfaces of the pieces 16 are indicated by broken off lines 25 in FIG. 4 while actually they are eliminated during the pressing. They disappear as a result of a type of welding.

If the stamp 18 of the press 17 has a rough portion 23, namely, a causticized or rayed portion, the last pressing operation results at the same time in an outer surface which prevents reflections.

I claim:

1. A luminescent screen comprising a vacuum case having a ray inlet window and an opposed end window, a cathode device located within said case opposite said inlet window and comprising superposed layers of a carrier of cesium iodite, a luminous layer of cesium iodite activated by sodium and a photo cathode layer of antimony-cesium, an anode located within said case adjacent to said end window, and cylindrical electrodes located between said cathode device and said anode, said anode having a luminescent screen facing said end window.

2. A screen in accordance with claim 1, wherein said carrier consists of six-edged pressed pieces of cesium iodide having a thickness of substantially 1 mm, said pressed pieces being further compressed after being put together.

3. A screen in accordance with claim 2, wherein said pressed pieces have a rough surface, causticized or rayed produced during said further compression.

* * * * *